United States Patent [19]

Kervagoret

[11] Patent Number: 4,622,814
[45] Date of Patent: Nov. 18, 1986

[54] HYDRAULIC ASSISTANCE DEVICE

[75] Inventor: Gilbert Kervagoret, Argenteuil, France

[73] Assignee: Societe Anonyme D.B.A., Paris, France

[21] Appl. No.: 701,901

[22] Filed: Feb. 15, 1985

[30] Foreign Application Priority Data

Feb. 29, 1984 [FR] France ............................. 84 03105
Mar. 28, 1984 [FR] France ............................. 84 04843

[51] Int. Cl.$^4$ ............................................ B60T 13/20
[52] U.S. Cl. ........................................ 60/555; 60/566
[58] Field of Search ............... 60/547.1, 560, 563, 60/564, 588, 555, 565, 566

[56] References Cited

U.S. PATENT DOCUMENTS

| | | | |
|---|---|---|---|
| 3,157,986 | 11/1964 | Gordon | 60/563 |
| 4,126,996 | 11/1978 | Leiber | 60/547.1 |
| 4,442,671 | 4/1984 | Reynolds | 60/547.1 |
| 4,449,369 | 5/1984 | Dauvergne | 60/563 |
| 4,474,004 | 10/1984 | Thomas | 60/547.1 |

Primary Examiner—Abraham Hershkovitz
Attorney, Agent, or Firm—Larry J. Palguta; Ken C. Decker

[57] ABSTRACT

Hydraulic assistance device of the mixed hydrodynamic/hydrostatic type incorporating a body (10) in which a first piston (18) is slideably mounted and moveable between a first position allowing the communication of a first chamber (53), joined to a braking circuit, to a reservoir (12), and isolating this chamber (53) from a source of high pressure fluid (86), and a second position isolating the chamber (53) from the reservoir (12) and connecting it with the source (86); a second chamber (30) in the body (10) connected by a passage (90) to the brakes (66), and valve mechanism (92) normally closing the passage (90) and sensitive to the pressure in the chamber (30) so that, when the latter pressure reaches a value which is greater than that existing in the first chamber (53), the valve mechanism (92) opens allowing fluid to flow between the second chamber (30) and the brakes (66).

5 Claims, 6 Drawing Figures

FIG_1

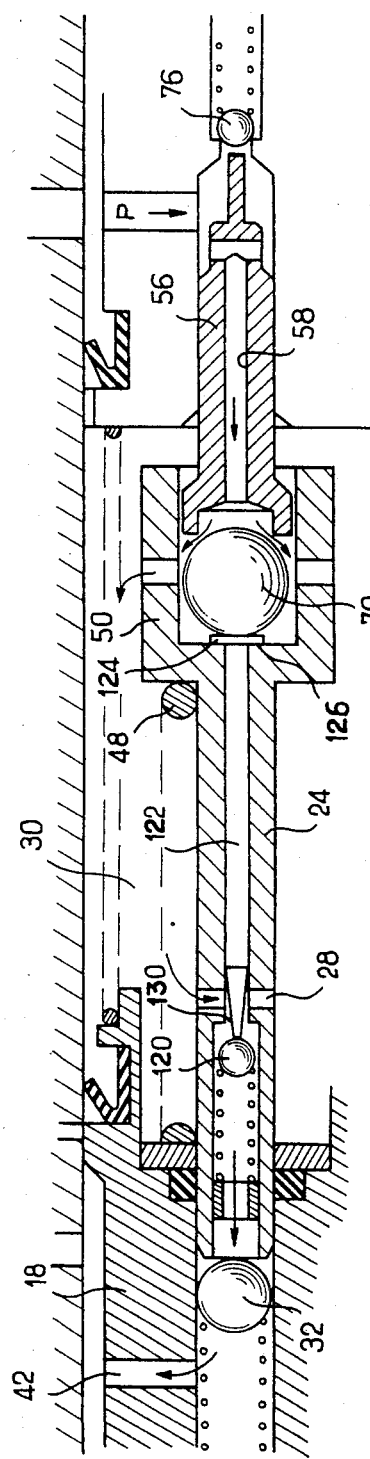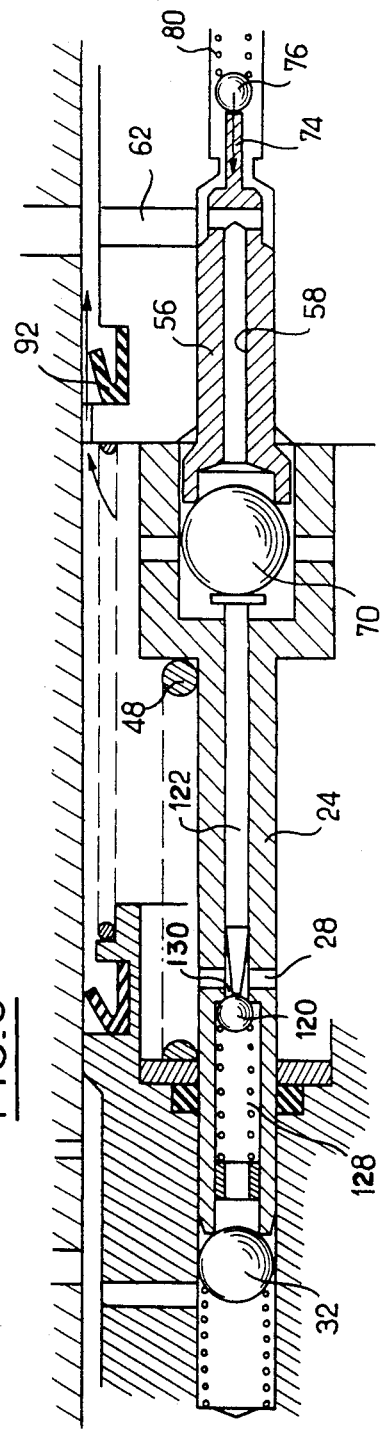
FIG.5
FIG.6

HYDRAULIC ASSISTANCE DEVICE

The present invention is concerned with hydraulic assistance devices and more particularly with such a device for a braking circuit with mixed hydrodynamic (more commonly referred to by the term "full-power") and hydrostatic operation.

A hydraulic amplifier for a braking circuit is known from French Patent Application No. 83/17,872 in the name of the Applicant Company, which is of the "full power" type incorporating a casing having first and second pressure chambers. A first piston is mounted so as to slide in the first chamber and a second piston is also mounted so as to slide in the second chamber, and is linked to the first piston by a spring. The two pressure chambers are joined together by a passage which is normally closed by a piston/valve assembly which is sensitive to the pressure in a circuit of high pressure fluid. Displacement of the first piston under the effect of the brake pedal causes displacement of the second piston which opens a valve joining the second chamber, which is in permanent communication with a braking circuit of the vehicle, to the high pressure circuit. In the event of a failure of the high pressure circuit, the piston/valve assembly is displaced and puts the two chambers in hydraulic communication. The first chamber is thus connected to the brakes and the first piston becomes the piston of a conventional master cylinder operating in a hydrostatic mode.

Despite its various advantages, however, this system is not completely satisfactory in that its construction is complicated and requires numerous drilling operations to form the passages.

The object of the invention is therefore to propose a hydraulic assistance device of the "full power" type, capable of operating as a conventional master cylinder in the event of failure of the high pressure circuit, which is of simple construction, of improved reliability and low manufacturing cost.

In accordance with the invention there is provided a hydraulic assistance device incorporating a body provided with a bore in which a first piston is slidably mounted and moveable under the effect of the actuation of a brake pedal, between a first position allowing the communication of a first chamber joined to a braking circuit and a low pressure reservoir, and isolating this chamber from a source of high pressure fluid, and a second position isolating the chamber from the low pressure reservoir and putting it into communication with the high pressure source, the device also incorporating a second chamber formed in the body, a passage causing this second chamber to communicate with the brakes, characterized in that the device incorporates a valve means in the passage in such a way that the passage is normally closed, the valve means being sensitive to the pressure in the second chamber so that, when the latter pressure reaches a value which is greater than that existing in the first chamber, the valve means opens allowing fluid to flow between the second chamber and the brakes.

The invention will now be described by way of example with reference to the accompanying drawings, in which:

FIGS. 3 to 6 are each a longitudinal section of a third embodiment of a hydraulic assistance device, each figure representing a different stage in the operation of the device.

In the description which follows, and in the drawings, identical or similar components carry the same reference numbers.

Figure 1:
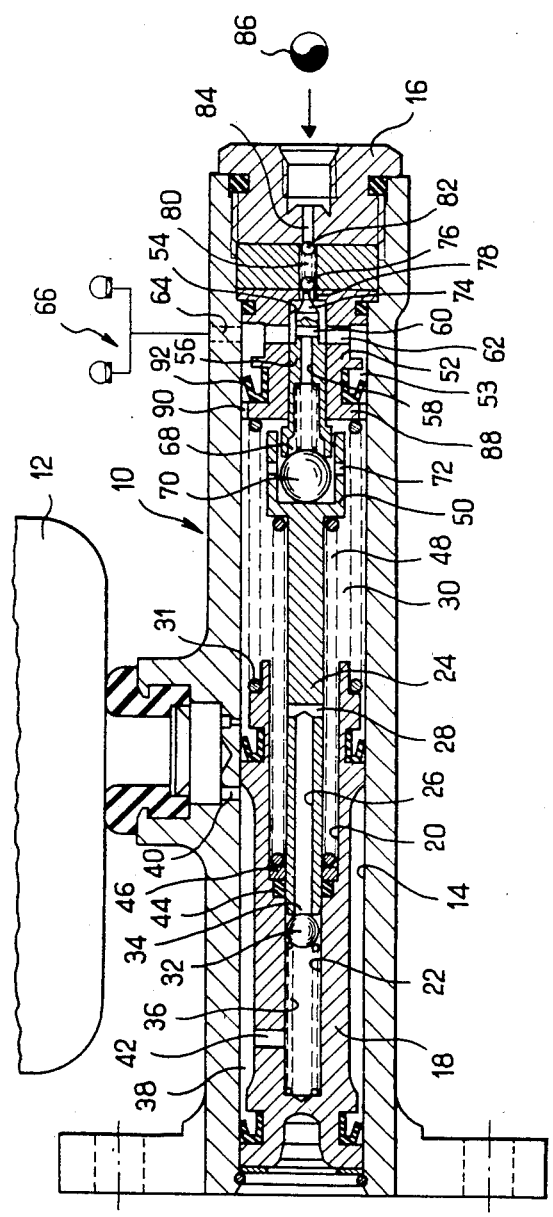
FIG. 1 is a view in longitudinal section of a hydraulic assistance device according to a first embodiment of the invention.

As shown in FIG. 1, the hydraulic assistance device incorporates a body 10 on which is mounted a low pressure reservoir 12 for hydraulic fluid. The body incorporates, in the example shown, a single bore 14 closed at one end by a plug component 16. A piston 18 is slidably mounted in the bore 14 and is capable of being actuated by a brake pedal (not shown). The piston 18 incorporates a stepped blind bore 20, in the portion of reduced diameter 22 of which a push rod 24 is slidably mounted. A longitudinal passage 26 and a transverse opening 28 are formed in the push rod 24 which together form a passage between the bore 22 and a pressure chamber 30. A ball valve 32 is provided in the bore 22 and is held against a seat 34 on the push rod 24 by a spring 36. The supply of hydraulic fluid to an annular region 38 surrounding the piston 18 is provided by an opening 40 which is in hydraulic communication with the bore 22 through an opening 42 in the piston 18. A seal between the upstream and downstream portions of the ball valve 32 is formed by a low-friction annular sliding seal 44 which is held in place by a washer 46 under the effect of a spring 48 which bears upon the right hand end (as shown in the Figure) of the push rod 24 which is enlarged at one end to form a housing 50.

A sleeve 52 is mounted so as to be fixed in the bore 14 of the body 10 and defines with the latter a second chamber 53. The sleeve 52 incorporates a bore 54 in which is slideably mounted, with a very small clearance, a control piston 56. The control piston 56 incorporates a bore 58 which is connected by orifices 60, 62, 64 to the brakes 66 of the vehicle. The bore 58 of the control piston 56 is provided with a seat 68 whose internal diameter is equal to the diameter of the piston 56. The seat 68 cooperates with a small valve 70 which is retained in the housing 50 of the push rod 24. The housing 50 has an opening 72 which, when the ball valve 70 is open, connects the pressure chamber 30 to the brakes 66 of the vehicle. The control piston 56 also incorporates a push rod 74 which, when the piston is displayed to the right, bears against a ball valve 76 and lifts the latter from its seat 78. The ball valve 76 is joined by a spring to a second ball valve 82 which closes an opening 84 of a passage which is in hydraulic communication with a source of high pressure fluid 86.

The sleeve 52 incorporates a portion 88 which includes a number of notches 90. These notches 90 allow fluid communication between the pressure chamber 30 and the brakes 66 of the vehicle but are normally closed by a lipped annular seal 92, the operating pressure in the chamber 53 normally being of the order of four times greater than the pressure in the chamber 30.

When the device is operated the piston 18 moves to the right and, by way of the spring 36, closes the ball valve 32 and, through the intermediary of the push rod 24, also ensures the closure of the ball valve 70. Displacement of the push rod 24 causes displacement of the control piston 56, which through the intermediary of the push rod 74, opens the ball valve 76. The ball valve 82 being held in its open position by the fluid pressure, opening the valve 76 enables fluid under pressure to flow towards the brakes 66 of the vehicle. This fluid under pressure also acts, through the bore 58, upon the ball valve 70 and thus counterbalances the force provided by the brake pedal. Thus, a well defined braking pressure corresponds to each given control force.

On releasing the brake pedal the piston 18 returns to the left under the effect of the various preloads to which it is subject. The braking pressure discharges through the ball valve 70 into the pressure chamber 30 and this surplus fluid passes through the ball valve 32 and the opening 42 towards the reservoir 12. If the release of the pedal is interrupted at any position, the ball valve 70 closes again and the braking pressure stabilizes at the corresponding value.

In the event of failure of the high pressure circuit, for example if the pump of the accumulator is out of action, the ball valve 82 closes and isolates the device from the high pressure circuit. When the brakes are applied, the housing 50 comes into abutment against the sleeve 52. The displacement of the piston 18 causes a rise in pressure in the pressure chamber 30, and the fluid pressure acts on the annular seal 92 and compresses it radially, which enables fluid to flow through the second chamber 53 towards the brakes 66 of the vehicle. Thus, in the event of breakdown of the high pressure circuit, the braking of the vehicle is ensured.

The axial length of the housing 50 is advantageously such that in the event of breakdown of the high pressure circuit the housing 50 comes into abutment against the rear surface of the sleeve 52 before the control piston 56 comes to bear against this component. The ball valve 70 is thus free of any preload at the moment when the pressure in the chamber 30 drops during the release of the braking force, and therefore the fluid in the brake circuit 66 can return rapidly towards the reservoir 12 through the bore 58 in the control piston, thus reducing the hysteresis of the system.

With the system thus described, for a given vehicle with a given pedal ratio, it is possible to modify the assistance ratio by modifying only the stiffness of the spring 36.

The braking device described above is intended for a single braking circuit. In practice, a system incorporating two identical devices would be provided, each associated with a respective braking circuit. In the latter case, both devices are advantageously situated in the same body.

Figure 2:
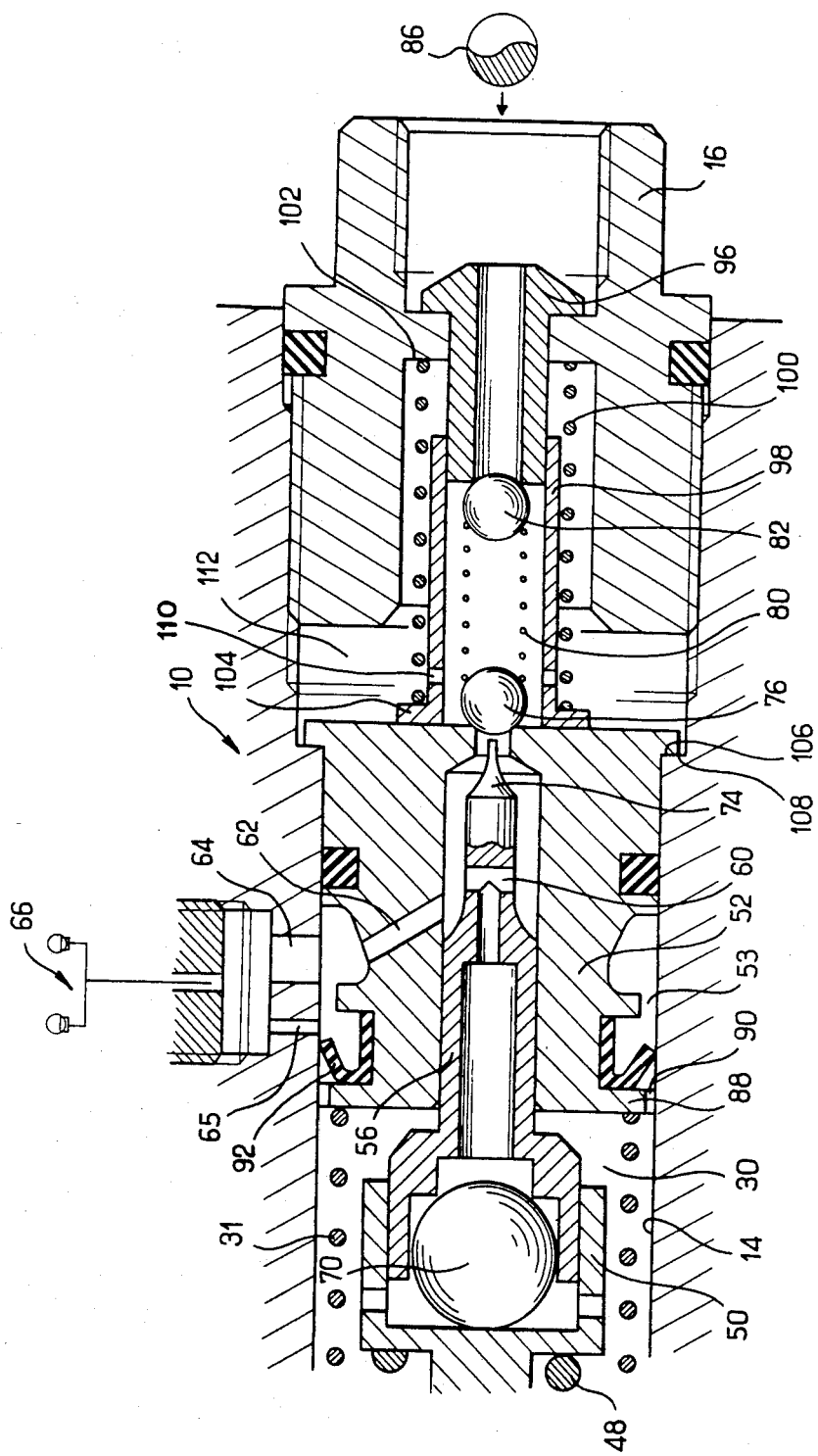
FIG. 2 is a partial view in longitudinal section of a second embodiment of a hydraulic assistance device.

FIG. 2 shows a hydraulic assistance device intended for an installation incorporating an accumulator for fluid under pressure and two braking circuits. This device differs from that shown in FIG. 1 in that the sleeve 52 is slideably mounted in the bore 14. The body 10 is provided with a second orifice 65 which, with the orifice 64, joins the chamber 53 to the brakes of the vehicle 66. The plug component 16 incorporates a tubular support 96 on which is slideably mounted a sleeve 98. A spring 100 is mounted around the sleeve 98 and bears at one end against an annular surface 102 of the plug component 16 and, at the other end, bears against an annular surface projecting radially outwards 104 from the sleeve 98. Thus under the effect of the spring 100, the sleeve 52 is pushed towards its rest position in which a flange 106 comes into abutment against a corresponding annular surface 108 of the casing 10. An orifice 110 in the sleeve 98 allows hydraulic communication between the inside of the sleeve 98 and a peripheral chamber 112. In the event of failure of the high pressure source 86, the chamber 112 is no longer maintained at the pressure of the source 86. When a braking application occurs, the drop in pressure in the chamber 112 allows the sleeve 52 to be displaced under the effect of the spring 31 and of the displacement to the right of the control piston 56. The displacement of the sleeve 52, on which is mounted the annular cup 92, puts the orifice 65, which is of small diameter, in direct communication with the chamber 30. In this condition, the device operates as a conventional master cylinder.

In the two embodiments described above the degree of pedal "feel" which the driver experiences during braking is a function of the fluid pressure in the chamber 30. In normal use this pressure increases slowly with the displacement of piston 18 which means that in certain circumtances the pedal travel may be undesirably long. The following embodiment includes certain modifications to the embodiment of FIG. 1 which result in reduced pedal travel.

Figure 3:
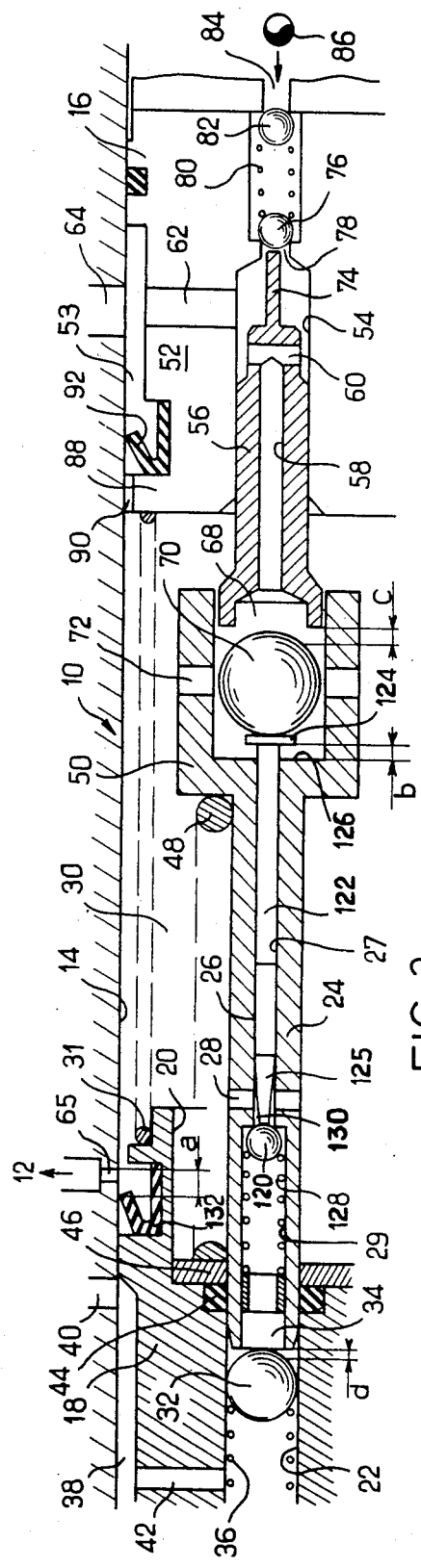

In the following description components which are common to the previous embodiments bear to the same reference numerals and will not be described in detail. The third embodiment shown in FIG. 3 differs over the embodiment of FIG. 1 in that longitudinal passage 26 of the push rod 24 is stepped to form a narrow portion 27 and a wide portion 29. In the narrow portion 27 is slidably mounted a pin 122 having an enlarged head 124 at one end and a tapered portion 125 at the other end. A ball valve 120 is located in the wide portion 29 of the passage 26 and is urged against a valve seat 130 by a spring 128. The ball valve 120 may be opened by displacement of the pin 122 and the maximum degree of opening of the valve 120 is determined by the clearance "b" between the head 124 of the pin 122 and an inner surface 126 of the housing 50 against which the head 124 abuts. The stiffness of the spring 128 is less than the force of the high pressure fluid which tends to close the ball valve 76 and thus, in normal working conditions, the ball valve 120 opens before the ball valve 76.

On the leading edge of piston 18 is mounted an annular seal 132 which is spaced, when the device is in its rest position, a distance "a" from a compensation opening 65 which ensures that the chamber 30 is in fluid communication with the reservoir 12. In the rest position, the maximum degree of opening of the ball valve 70 is represented by "c" and thus the required displacement of the push rod 24 to close the ball valve 70 and bring the push rod 74 into contact with the ball valve 76 is equal to "b"+"c" which is less than or equal to "a". As a result, when the ball valve 76 is opened the ball valve 120 is already open and thus, relative to ambient pressure, there is no excess pressure in the chamber 30.

Figure 4:
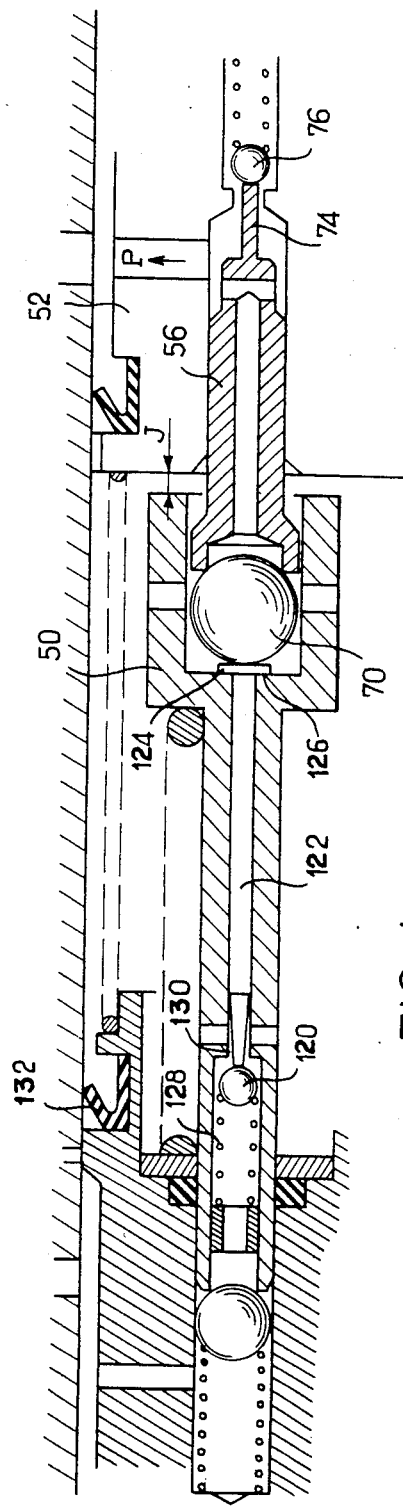

FIG. 4 shows the device in the position adopted in the course of normal assisted braking operation. It will be noted that the head 124 of the pin 122 is butted up against the inner surface 126 of the housing and that ball valves 76 and 120 are open. The housing 50 is spaced a distance "j" from the sleeve 52.

In FIG. 5 the device is shown in the release position, that is the position adopted following the release of the brake pedal after a braking operation. Spring 48 is no longer under compression and the assembly comprising the push rod 24, ball valve 70 and the command piston all move to the left and the ball valve 76 closes. When the force exerted by the spring 48 becomes inferior to that of the pressure P in the bore 58 which acts on the ball valve 70, the valve 70 opens and causes a drop in the braking pressure as the fluid under pressure passes into the chamber 30. Thus the pressure P decreases at a rate proportional to the stiffness of the spring 48. During the release phase the ball valve 120 remains open to allow fluid from the brakes to flow past ball valve 32 and return to the reservoir. As a result the pressure in chamber 30 remains substantially that defined by the position of piston 18.

In the event of failure of the high pressure circuit the device adopts the position show in FIG. 6 upon operation of the brake pedal. The spacing "j" between the housing 50 and the sleeve 52 becomes zero as there is no longer any high pressure fluid to counterbalance the effect of spring 48. Spring 128 closes the ball valve 120 which, by way of pin 122, closes ball valve 70. The spring 80, while weak, is sufficiently strong to urge the command piston 56 to the left and keep ball valve 70 closed. As a result of the weak forces to which it is subject, the ball valve 70 is almost free in the housing 50.

As ball valves 32 and 120 are now closed the device functions as a conventional master cylinder. Chamber 30 becomes a hydrostatic pressure chamber in which a working pressure is produced which is proportional to the force applied to the piston 18, to the stiffness of spring 48 and the absorption characteristics of the brakes. As in the case of the previous embodiments the pressurized fluid is fed to the brakes by way of the lipped annular seal 92. Upon release of braking the fluid returns to the reservoir by way of ball valve 70, chamber 30 and ball valves 120 and 32.

The spring 128 is of sufficient stiffness that the ball valve 120 is held closed during emerging braking.

I claim:

1. A hydraulic assistance device incorporating a body provided with a bore in which a first piston is slideably mounted and movable by actuation of a brake pedal, between a first position allowing communication of a first chamber joined to a braking circuit and a low pressure reservoir, and isolating the first chamber from a high pressure source, and a second position isolating the first chamber from the low pressure reservoir and placing the first chamber into communication with the high pressure source, the device including a second chamber formed in the body and a first passage communicating the second chamber with the brakes, characterized in that the device comprises first valve means in the first passage so that the first passage is normally closed, the first valve means being sensitive to pressure in the second chamber so that when pressure in the second chamber exceeds pressure existing in the first chamber the first valve means opens to allow fluid to flow between the second chamber and brakes, the first chamber formed in the bore between the body and a sleeve, the communication between the first chamber and reservoir including a second bore in the sleeve, a second piston slidably mounted in the second bore and connected with the first piston, second valve means between the high pressure source and first chamber and capable of being controlled by the second piston, an annular space in the bore between the sleeve and the body, the first valve means including a lipped annular seal mounted on the sleeve, a push rod slidably mounted in a bore in the first piston and joining the first piston to the second piston, the communication between the first chamber and reservoir including a bore in the second piston, a second passage in the push rod and an opening in the first piston, and third valve means controlling the communication between the first chamber and reservoir.

2. The hydraulic assistance device in accordance with claim 1, characterized in that the push rod further comprises fourth valve means linked to the third valve means and operable to close the communication between the first chamber and reservoir.

3. The hydraulic assistance device in accordance with claim 2, characterized in that the device further comprises spring means operable to urge the fourth valve means into a closed position.

4. The hydraulic assistance device in accordance with claim 3, characterized in that the fourth valve means is located in the second passage in the push rod.

5. The hydraulic assistance device in accordance with claim 4, characterized in that the device further comprises a pin slidably mounted in the second passage and linking the fourth valve means to the third valve means.

* * * * *